(12) United States Patent
Fenollosa Climent et al.

(10) Patent No.: US 11,911,831 B2
(45) Date of Patent: Feb. 27, 2024

(54) BORING HEAD WITH A MECHANISM FOR CLAMPING A DISPLACEABLE TOOL CARRIER

(71) Applicant: Big Kaiser Prazisionswerkzeuge AG, Rümlang (CH)

(72) Inventors: Jose Maria Fenollosa Climent, Hünenberg (CH); Lukas Thalmann, Winterthur (CH); Manuel Martin, Zürich (CH); Pascal Rohrer, Niederhasli (CH); Christoph Stüssi, Zürich (CH)

(73) Assignee: Big Kaiser Prazisionswerkzeuge AG (CH)

( * ) Notice: Subject to any disclaimer, the term of this patent is extended or adjusted under 35 U.S.C. 154(b) by 0 days.

(21) Appl. No.: 17/613,692

(22) PCT Filed: May 28, 2020

(86) PCT No.: PCT/EP2020/064816
§ 371 (c)(1),
(2) Date: Nov. 23, 2021

(87) PCT Pub. No.: WO2020/239897
PCT Pub. Date: Dec. 3, 2020

(65) Prior Publication Data
US 2022/0219246 A1    Jul. 14, 2022

(30) Foreign Application Priority Data
May 29, 2019  (EP) ...................................... 19177207

(51) Int. Cl.
*B23B 29/03* (2006.01)
*B23B 29/034* (2006.01)

(52) U.S. Cl.
CPC .... *B23B 29/03414* (2013.01); *B23B 2229/16* (2013.01); *B23B 2260/108* (2013.01)

(58) Field of Classification Search
CPC .......... B23B 29/03414; B23B 2229/16; B23B 29/03407; B23B 29/03403; B23B 29/034; B23B 29/03; B23B 2260/108
See application file for complete search history.

(56) References Cited

U.S. PATENT DOCUMENTS 2,990,730 A    7/1961  Pougnand
2,998,736 A    9/1961  Frederick
(Continued)

FOREIGN PATENT DOCUMENTS

CN    201309095       9/2009
CN    102423830 A     4/2012
(Continued)

OTHER PUBLICATIONS

International Search Report for Application No. PCT/EP2020/064816, dated Aug. 7, 2020, 3 pages.

*Primary Examiner* — Alan Snyder
(74) *Attorney, Agent, or Firm* — Lerner David LLP

(57) ABSTRACT

A boring head is provided comprising a tool body (1) having a main rotation axis (R) about which the tool body (1) rotates during boring operations. The boring head further comprises a tool carrier (6) arranged in or on the tool body (1), a first motor (9) for displacing the tool carrier (6) relative to the tool body (1) and a clamping mechanism (26) with a clamping element (27, 55, 68, 81) for effecting a clamping force on the tool carrier (6), in order to prevent a displacement of the tool carrier (6) relative to the tool body (1) during boring operations. The clamping mechanism (26) is an active clamping mechanism which effects a clamping force that can be adjusted actively.

21 Claims, 9 Drawing Sheets

(56) References Cited

U.S. PATENT DOCUMENTS

| | | |
|---|---|---|
| 3,174,766 A | 3/1965 | Cox et al. |
| 4,933,868 A | 6/1990 | McMurtry |
| 5,012,710 A | 5/1991 | D'Andrea et al. |
| 5,669,742 A | 9/1997 | Sjoo et al. |
| 6,053,082 A | 4/2000 | Rupp et al. |
| 6,134,996 A | 10/2000 | Scheer et al. |
| 6,147,436 A | 11/2000 | Claeyssen et al. |
| 6,394,710 B1 | 5/2002 | Kurz |
| 6,586,862 B1 | 7/2003 | Cselle |
| 6,664,710 B1 | 12/2003 | Gottlieb et al. |
| 6,707,235 B1 | 3/2004 | Brebøl |
| 9,033,623 B2 | 5/2015 | Nakamura et al. |
| 2001/0038258 A1 | 11/2001 | Fischer et al. |
| 2003/0159735 A1 | 8/2003 | Barillot et al. |
| 2004/0136793 A1 | 7/2004 | Shiraiwa |
| 2004/0140737 A1 | 7/2004 | Barillot et al. |
| 2005/0166727 A1 | 8/2005 | Peltonen et al. |
| 2006/0008336 A1 | 1/2006 | Neumann et al. |
| 2007/0084320 A1 | 4/2007 | Frank et al. |
| 2009/0133976 A1 | 5/2009 | Bose et al. |
| 2009/0146528 A1 | 6/2009 | Bachmaier et al. |
| 2009/0215598 A1 | 8/2009 | Migliore et al. |
| 2010/0026140 A1 | 2/2010 | Gottlieb et al. |
| 2010/0038995 A1 | 2/2010 | Claeyssen et al. |
| 2010/0043552 A1 | 2/2010 | Stenbock Andersen et al. |
| 2010/0054882 A1 | 3/2010 | Frank et al. |
| 2010/0061819 A1 | 3/2010 | Frank et al. |
| 2010/0278310 A1 | 11/2010 | Dehler et al. |
| 2010/0328969 A1 | 12/2010 | Meyer |
| 2012/0058871 A1 | 3/2012 | Nakamura et al. |
| 2012/0269590 A1 | 10/2012 | Buck |
| 2013/0071193 A1 | 3/2013 | Kocherovsky et al. |
| 2013/0209188 A1 | 8/2013 | Frank et al. |
| 2014/0133930 A1 | 5/2014 | Weidinger |
| 2014/0167571 A1 | 6/2014 | Meyer |
| 2014/0334192 A1 | 11/2014 | Meyer et al. |
| 2015/0098769 A1 | 4/2015 | Munigala |
| 2015/0155799 A1 | 6/2015 | Mangeot |
| 2015/0171308 A1 | 6/2015 | Devilliers et al. |
| 2015/0174666 A1 | 6/2015 | Matlik |
| 2015/0231706 A1 | 8/2015 | Frank |
| 2016/0052063 A1 | 2/2016 | Englund |
| 2016/0052064 A1 | 2/2016 | Matlik |
| 2016/0052065 A1 | 2/2016 | Englund |
| 2016/0089730 A1 | 3/2016 | Kocherovsky |
| 2017/0165760 A1 | 6/2017 | Paul et al. |
| 2017/0341109 A1 | 11/2017 | Forissier et al. |
| 2018/0250753 A1 | 9/2018 | Frank |
| 2019/0022765 A1 | 1/2019 | Lemoine et al. |
| 2019/0118267 A1 | 4/2019 | Karlsson |
| 2019/0176243 A1 | 6/2019 | Fenollosa et al. |

FOREIGN PATENT DOCUMENTS

| | | | |
|---|---|---|---|
| CN | 103042403 A | 4/2013 | |
| CN | 103481077 A | 1/2014 | |
| CN | 103537721 A | 1/2014 | |
| CN | 205342518 | 6/2016 | |
| DE | 19643180 A1 | 4/1997 | |
| DE | 102007058657 A1 | 8/2008 | |
| EP | 0673710 B1 | 10/1999 | |
| EP | 1820590 A2 | 8/2007 | |
| EP | 2502692 A1 * | 9/2012 | ....... B23B 29/03403 |
| EP | 2816723 B1 | 4/2016 | |
| FR | 2793598 A1 | 11/2000 | |
| FR | 2929753 A1 | 10/2009 | |
| FR | 2973778 A1 | 10/2012 | |
| JP | H08155705 | 6/1996 | |
| JP | 3252996 B2 | 2/2002 | |
| SE | 506053 C2 | 11/1997 | |
| WO | 0062962 A1 | 10/2000 | |
| WO | 0249791 A1 | 6/2002 | |
| WO | 2005032747 A1 | 4/2005 | |
| WO | 2006125798 A2 | 11/2006 | |
| WO | 2006125806 A1 | 11/2006 | |
| WO | 2006136546 A1 | 12/2006 | |
| WO | 2007112741 A1 | 10/2007 | |
| WO | 2008000695 A1 | 1/2008 | |
| WO | 2009080592 A1 | 7/2009 | |
| WO | 2009133033 A1 | 11/2009 | |
| WO | 2010097407 A1 | 9/2010 | |
| WO | 2017162355 A1 | 9/2017 | |
| WO | 2018029308 A1 | 2/2018 | |
| WO | 2020127717 A1 | 6/2020 | |

\* cited by examiner

BORING HEAD WITH A MECHANISM FOR CLAMPING A DISPLACEABLE TOOL CARRIER

CROSS-REFERENCE TO RELATED APPLICATIONS

The present application is a national phase entry under 35 U.S.C. § 371 of International Application No. PCT/EP2020/064816, filed on May 28, 2020 which claims priority from European Patent Application No. 19177207.8 filed on May 29, 2019, the disclosure of which is incorporated herein by reference.

TECHNICAL FIELD

The present invention relates to a boring head with a clamping mechanism for clamping a displaceable tool carrier, in order to prevent a displacement of the tool carrier relative to a tool body during boring operations.

PRIOR ART

Boring heads which are used for example for chip forming metal cutting often comprise a tool carrier which is radially displaceable with respect to a tool body, in order to allow a radial adjustment of the cutting tool attached to the tool carrier. Such boring heads are for example used for enlarging an already existing hole by means of rotating the boring head with the cutting tool attached thereto. A radial displacement of the tool carrier not only enables a variable cutting diameter, but also allows compensating for wear of the cutting tool in-between boring operations.

For adjusting the boring diameter, the radial displacement of the tool carrier is usually carried out manually by the user. For this purpose, the user rotates an adjustment screw engaging with a threaded bore of the tool carrier, in order to radially displace the tool carrier relative to the tool body. Manual adjustments, however, are time-consuming and often imprecise. Thus, there is a need for boring heads having a motor-driven tool carrier, i.e. a tool carrier that can be radially displaced relative to the tool body by means of a motor.

In US 2017/165760 A1, a motor-driven electric actuator is disclosed for radially displacing the cutting tool of a boring head. The electric actuator, however, represents an external device which still requires manual handling and an interruption of the boring operation.

Boring heads having a motor to displace a tool carrier are for example disclosed in DE 197 17 172 A1, WO 88/03672 A1 JP 3 252996 B2 and EP 3 222 375 A1.

Some prior art documents, such as WO 00/62962 A1 and US 2014/0133930 A1, propose a motorized radial or axial displacement of a tool carrier in a boring head by means of a piezoelectric mechanism.

A challenge with tool carriers that can be displaced by means of a motor represents in particular their fixation within the tool body during the boring operation. During boring operations, large forces and in particular large radial forces usually act on the cutting tool and on the tool carrier. Due to these forces, the tool carrier tends to be displaced in a radial direction, which needs to be prevented by all means, in order to achieve a good boring result. The force of the displacement motor itself at rest is usually by far not sufficient, in order to prevent such an unwanted displacement during boring operations.

In U.S. Pat. No. 6,394,710 B1 and in EP 2 095 897 A1 pre-stressed spring elements are used to effect a clamping force on a tool carrier, in order to prevent an unwanted radial or axial displacement of the tool carrier during the boring operations. The provision of such a passive clamping mechanism, however, results in the requirement of a larger force for the intended displacement of the tool carrier. If a motor is used for carrying out the displacement, a correspondingly stronger and larger dimensioned motor is needed in this case. Such larger dimensioned motors, however, are not only more expensive, but are also difficult to arrange within the limited space of a boring head.

Furthermore, it is noted that different embodiments of piezoactive actuators are disclosed in DE 10 2004 002 249 A1 and DE 19643180 A1.

SUMMARY OF THE INVENTION

It is an object of the present invention to provide a boring head with a tool carrier that can easily be displaced on the one hand and is fixed with respect to tool body during boring operations on the other hand.

In order to achieve this object, the present invention thus provides a boring head comprising
- a tool body having a main rotation axis about which the tool body rotates during boring operations;
- a tool carrier arranged in or on the tool body;
- a first motor for displacing the tool carrier relative to the tool body; and
- a clamping mechanism with a clamping element for effecting a clamping force on the tool carrier, in order to prevent a displacement of the tool carrier relative to the tool body during boring operations.

The clamping mechanism is an active clamping mechanism which effects a clamping force that can be adjusted actively.

In comparison to a passive clamping mechanism, an active clamping mechanism does not require the presence of a preload. As a result, the force for displacing the tool carrier can be reduced significantly, meaning that the requirements with respect to the first motor are lower. On the other hand, by means of an active clamping mechanism, a high clamping force can be exerted on the tool carrier during the boring operation, in order to prevent an unwanted displacement of the tool carrier relative to the tool body. If a displacement of the tool carrier relative to the tool body by means of the first motor is necessary, however, the tool carrier can be released by the clamping mechanism, in order to enable an easy displacement.

Thus, the boring head comprises an active clamping mechanism which effects a clamping force that can be adjusted actively. In contrast, the clamping force cannot be adjusted actively in a passive clamping mechanism, such as in a clamping mechanism which is formed by a spring only. The active clamping mechanism usually comprises at least one element which can be activated and/or deactivated. With an active clamping mechanism, an energy flow usually takes place from an energy source to the clamping mechanism, when the clamping mechanism is activated and/or is in its activated state. Thus, for activating the active clamping mechanism, an energy storage device, in particular an electric energy storage device, such as one or several batteries, is preferably provided, in order to supply the required energy. The boring head is preferably adapted to actively adjust the clamping force based on an input instruction by an operator and/or by a control logic implemented e.g. in a printed circuit board (PCB) of the boring head.

The clamping mechanism is preferably adapted to be activated and/or to be in its activated state for enabling displacement of the tool carrier relative to the tool body. Furthermore, the clamping mechanism is preferably adapted to be deactivated and/or to be in its deactivated state for disabling displacement of the tool carrier relative to the tool body.

The main rotation axis of the tool body represents the axis about which the boring head rotates as intended during normal boring operations. The tool body is preferably made as a whole in one piece.

The tool carrier serves to carry the tool. The tool is usually a cutting tool, such as a cutting insert, which can be attached to the tool carrier directly or indirectly, e.g. via a cutting tool holder.

In a particularly preferred embodiment, the tool carrier is transversely displaceable relative to the tool body, meaning that the tool carrier is displaceable in a transverse direction relative to the main rotation axis. With respect to displacements of the tool carrier, the transverse direction can be, but does not necessarily need to be the same as a perpendicular direction relative to the main rotation axis. Within the present context, a displacement along a transverse direction means that a radial displacement of the cutting tool relative to the main rotation axis is effected, such that during the boring operation a hole with a wider or smaller diameter results as a direct consequence of the displacement. Thus, although in in most cases preferred, it is not absolutely necessary that a displacement of the tool carrier along the transverse direction is the same and has the same effect as a displacement along a direction perpendicular to the main rotation axis. The direction along which the tool carrier is adapted to be displaced relative to the tool body by means of the first motor is herein referred to as the displacement direction.

The tool carrier is usually arranged within an opening of the tool body. The opening or bore can particularly be a through-opening. In certain embodiments, however, it is also conceivably that the tool carrier is displaceably attached to an outer side of the tool body. The tool carrier is preferably attached such to the tool body that it cannot be removed from the tool body without using special tools. The tool carrier is preferably made as a whole in one piece.

The first motor is preferably an electric motor, such as a DC-motor. In certain embodiments, however, it is also conceivable to use a piezoelectric motor or a hydraulic motor as the first motor. The first motor is preferably integrated at least in part, but advantageously completely, within the boring head, in particular within the tool body. In most cases, the first motor has a stator and a rotor with a drive shaft. The drive shaft is attached to the rotor in a torque proof manner and, in a preferred embodiment, is even made in one piece with the rotor. By the rotation of the rotor during operation of the motor, a main drive axis is defined.

In preferred embodiments, the main drive axis of the first motor extends in parallel to the direction along which the tool carrier is displaceable relative to the tool body and advantageously in a direction perpendicular to the main rotation axis. An optimal transmission of the power effected by the first motor on the tool carrier can then be achieved. In these embodiments, the drive shaft preferably has an outer thread and the tool carrier comprises a bore with an inner thread or a nut with an inner thread is attached in a torque proof manner to the tool carrier. The outer thread of the drive shaft engages with this inner thread of the tool carrier or of the nut, such that a rotational motion of the rotor effected by the first motor is transferred into a displacement of the tool carrier relative to the tool body.

In other, also preferred embodiments, the main drive axis extends perpendicularly to the direction along which the tool carrier is displaceable relative to the tool body and advantageously in parallel to the main rotation axis. These embodiments have the advantage that the first motor can be better integrated in the boring head, in particular if a relatively large first motor is used. For transferring the rotational motion effected by the first motor into a displacement of the tool carrier relative to the tool body, a worm gear is preferably provided in these embodiments. By having a gear unit, in particular a gear unit with a worm gear, the applied force for displacing the tool carrier can be increased or, in other words, a smaller dimensioned first motor can be used to apply the same force for displacing the tool carrier.

In certain embodiments, the tool carrier has a first and a second end when viewed along a perpendicular direction relative to the main rotation axis, the first end being adapted for the attachment of a cutting tool. The first motor then preferably acts on the second end to displace the tool carrier.

In other embodiments, the tool carrier comprises a bore which extends along the main rotation axis of the tool body, the bore being adapted receiving a cutting tool or a cutting tool holder. Thus, the cutting tool or the cutting tool holder can in this case be attached to the boring head by insertion into the bore of the tool carrier. The fixation within the bore of the tool carrier can for example be effected by means of fixation screws.

The tool carrier does not necessarily need to be displaceable along a transverse direction relative to the main rotation axis of the tool body. It is also possible that the first motor is adapted to displace the tool carrier in parallel to the main rotation axis, in order to displace the cutting tool in an axial direction.

The clamping mechanism is preferably adapted to clamp the tool carrier against the tool body or against another element of the boring head. For this purpose, the clamping mechanism preferably comprises a clamping element with a clamping surface that is adapted to directly or indirectly bear against an outer surface of the tool carrier, in order to prevent any unwanted displacements of the tool carrier relative to the tool body during boring operations. The clamping surface is preferably shaped correspondingly to a respective part of the outer surface of the tool carrier, in order to maximize the mutual contact surface and, thus, the resulting friction between the clamping element and the tool carrier.

In a particularly preferred and advantageous embodiment, the clamping mechanism has an idle state in which the tool carrier is clamped and an activated state in which a displacement of the tool carrier relative to the tool body is enabled. Thus, an activation of the clamping mechanism is preferably necessary, in order to release the tool carrier and to enable a displacement of the tool carrier relative to the tool body. For activating the clamping mechanism and/or to keep the clamping mechanism in its activated state, a supply of energy to the clamping mechanism e.g. from one or several batteries, is preferably necessary. In the idle state, however, the tool carrier is clamped by the clamping mechanism in such a way that it cannot be displaced relative to the tool body. Preferably, no energy supply is necessary, in order to keep the clamping mechanism in its idle state. The clamping mechanism is preferably designed such that if it is in its activated state and the supply of energy is interrupted, the clamping mechanism automatically adopts its idle state. During the machining of a workpiece, i.e. during normal boring operations, the clamping mechanism is preferably adapted to be in its basic, idle state.

By providing an active clamping mechanism which clamps the tool carrier in the idle state and releases the tool carrier in the activated state—and not vice versa—the safety of the boring head can be improved greatly with regard to boring operations. For example, if the energy supply to the clamping mechanism is inadvertently interrupted or becomes insufficient due to a low charging state of the battery, there is no risk that the tool carrier is released during a boring operation and, as a result, impairs the machined workpiece or, even worse, represents a risk to the operating personnel.

In other, also preferred embodiments, the clamping mechanism is adapted to increase or decrease the clamping force upon activation. Thus, in the activated state of the clamping mechanism, the clamping force can for example be changed to clamp or release the tool carrier, while in the inactivated (or idle) state, the clamping force can remain unchanged. If the clamping force remains unchanged in the inactivated state, it can particularly be guaranteed that during boring operations, if e.g. the energy supply to the clamping mechanism is inadvertently interrupted or becomes insufficient due to a low charging state of the battery, the clamping of the tool carrier is maintained.

According to a development of the invention, the clamping mechanism is based on the piezoelectric effect and comprises at least one piezo element. A piezo element, which can also be referred to as a piezoelectric element, is an element which carries out a mechanical movement, in particular an expansion, as a result of an electric voltage acting on the element.

By using a clamping mechanism that is based on the piezoelectric effect, an optimal and direct conversion of electric energy into a mechanical clamping force can be achieved. In other embodiments, for example an electric DC-motor could be used instead.

According to another development of the invention, the boring head comprises a second motor, which is in particular in the form of a DC-motor, for actively adjusting the clamping force. The second motor is preferably adapted to actively adjust the force that is applied on the tool carrier by the clamping element.

In a preferred embodiment, the clamping element has the form of a clamping bracket which at least partly, preferably completely, surrounds a further clamping element of the clamping mechanism in such a way, that an expansion of the further clamping element along a first direction is converted into a contraction of the clamping bracket along a perpendicular second direction. The further clamping element can particularly be the at least one piezo element as already mentioned. With a clamping element in the form of a clamping bracket, a relatively small-dimensioned clamping mechanism can be achieved which clamps the tool carrier in its idle state and releases the tool carrier in its activated state.

In another preferred embodiment, the clamping element has the form of a clamping beam which is adapted to be moved away from the tool carrier by means of an expansion of a further clamping element of the clamping mechanism. The further clamping element can particularly be the at least one piezo element as already mentioned. With a clamping element in the form of a clamping beam, it is possible to achieve a particularly large clamping force.

The clamping beam preferably comprises the clamping surface and advantageously extends in a direction perpendicular to the direction along which the tool carrier is displaceable. The clamping beam preferably has at least one section with a comparatively low stiffness and at least one section with a comparatively high stiffness. The section with low stiffness preferably forms a hinge around which the clamping beam is pivotable and the section with high stiffness comprises the clamping surface. The clamping beam as a whole advantageously represents a lever arm which can be moved towards and away from the tool carrier by means of the further clamping element.

In yet another preferred embodiment, the clamping mechanism comprises one or more wedges for effecting a clamping force on the tool carrier.

In one preferred embodiment, the clamping mechanism comprises two wedges which can be moved towards each other or away from each other, in order to increase or decrease the clamping force. For moving the two wedges, a threaded shaft is preferably provided which extends through the wedges and mates with corresponding inner threads of the wedges, the threads being oriented in opposite directions. The threaded shaft is advantageously driven by a motor, in particular a DC-motor.

In a further preferred embodiment, the clamping element comprises a clamping surface that extends in parallel to the displacement direction of the tool carrier and the clamping mechanism preferably further comprises a spring element that applies a spring force on the clamping element in a perpendicular direction of the displacement direction. In this embodiment, the clamping surface is preferably inclined with respect to direction of the spring force effected by the spring element. In this way, the force effected by the spring element is advantageously redirected to the tool carrier by the inclined surface, in order to clamp the tool carrier against the tool body.

The clamping mechanism can comprise at least two levers which are hinged to each other and serve to displace the clamping element in a direction opposite to the direction of the force that is applied by the spring element on the clamping element. A motor, in particular a DC-motor, is advantageously provided, in order to move the levers. Thus, the clamping force effected by the clamping mechanism can actively be adjusted by the motor via the levers.

The clamping surface as provided by the clamping mechanism is preferably adapted to the outer surface of the tool carrier, in order to improve the retention force.

The boring head can comprise a rotation sensor for measuring the rotational position of a drive shaft or of a drive spindle which is used to transfer a rotational motion effected by the motor into a displacement of the tool carrier relative to the tool body. Alternatively or in addition, the boring head can comprise a position sensor for measuring the position of the tool carrier relative to the tool body. An unintended rotation and/or displacement of the tool carrier during the boring operations can be detected by means of a rotation sensor and/or a position sensor.

According to a further development of the invention, the clamping surface of the clamping mechanism which acts directly on an outer surface of tool carrier and/or the outer surface of the tool carrier, in particular the outer surface of the tool carrier which is contacted by the clamping surface, preferably comprises a high-friction coating, in order to improve the retention force of the clamping mechanism to the tool carrier. In this way, the clamping effect of the clamping mechanism can be improved.

According to another further development of the invention, the tool carrier and/or the tool body comprises a low-friction coating, in order to facilitate the displacement of the tool carrier relative to the tool body. The provision of the low-friction coating allows the employment of a smaller-dimensioned motor for displacing the tool carrier.

According to yet another further development of the invention, the tool carrier and/or the tool body comprises a high-friction coating in a region where the tool carrier contacts the tool body, in order to avoid displacements of the tool carrier relative to the tool body in particular during boring operations. The provision of a high-friction coating in a region where the tool carrier contacts the tool body is particularly advantageous, in order to avoid displacements which are caused by a certain play of the elements of the clamping mechanism.

It has been realized that the application of a high- and/or low-friction coating on an outer surface of the tool carrier and/or on the outer surface of the tool carrier and/or on the tool body can be provided independently of the type of clamping mechanism used and even in boring heads having a manually displaceable tool carrier. In particular, the coatings as mentioned cannot only by used in combination with an active clamping mechanism as indicated above, but also with passive clamping mechanisms which are based for example on a spiral spring only. Furthermore, the coatings as described can even be used in combination with boring heads in which the tool carrier is clamped manually, e.g. by means of one or several fixation screws, and/or is displaced manually, e.g. by means of an adjustment screw.

Thus, the present invention is also directed to a boring head, in particular to a boring head as indicated above, comprising a tool body having a main rotation axis about which the tool body rotates during boring operations;

a tool carrier arranged in or on the tool body and being displaceable relative to the tool body;

a clamping mechanism with a clamping element for effecting a clamping force on the tool carrier, in order to prevent a displacement of the tool carrier relative to the tool body during boring operations;

wherein the clamping mechanism comprises a clamping surface acting directly on an outer surface of tool carrier.

The clamping surface of the clamping mechanism and/or the outer surface of the tool carrier comprises a high-friction coating, in order to improve the retention force of the clamping mechanism, and/or the tool carrier and/or the tool body comprises a low-friction coating, in order to facilitate the displacement of the tool carrier relative to the tool body, and/or the tool carrier and/or the tool body comprises a high-friction coating, in order to avoid undesired displacements of the tool carrier relative to the tool body.

Particularly preferred is an embodiment in which the tool carrier comprises both a high-friction coating and a low-friction coating.

BRIEF DESCRIPTION OF THE DRAWINGS

Preferred embodiments of the invention are described in the following with reference to the drawings, which are for the purpose of illustrating the present preferred embodiment of the invention and not for the purpose of limiting the same. In the drawings.

DESCRIPTION OF PREFERRED EMBODIMENTS

Figure 1:
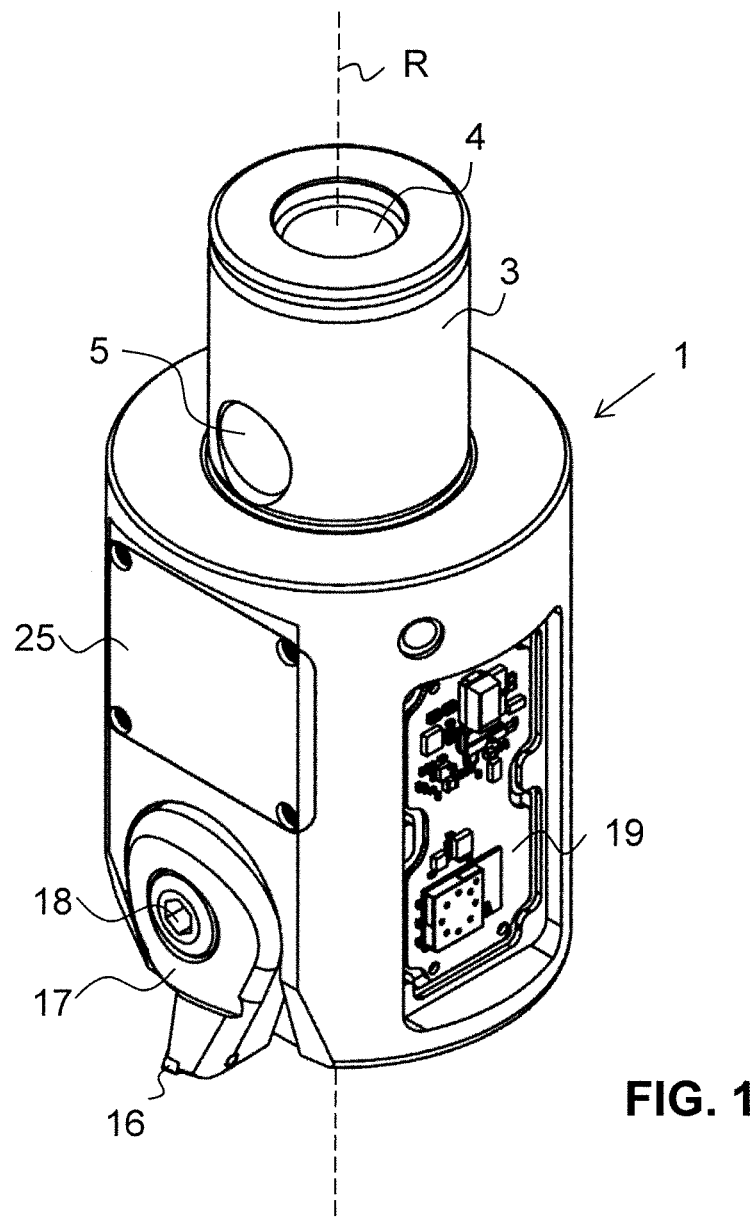
FIG. 1 shows a perspective view of a first embodiment of an inventive boring head with an active clamping mechanism.
Figure 2:
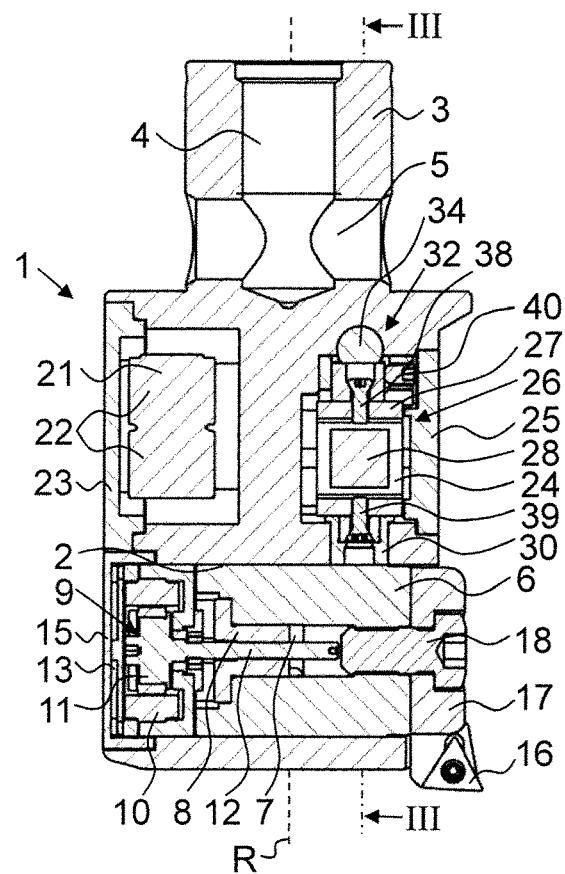
FIG. 2 shows a central cross-sectional view of the boring head of FIG. 1 along the plane II-II as depicted in FIG. 3.
Figure 3:
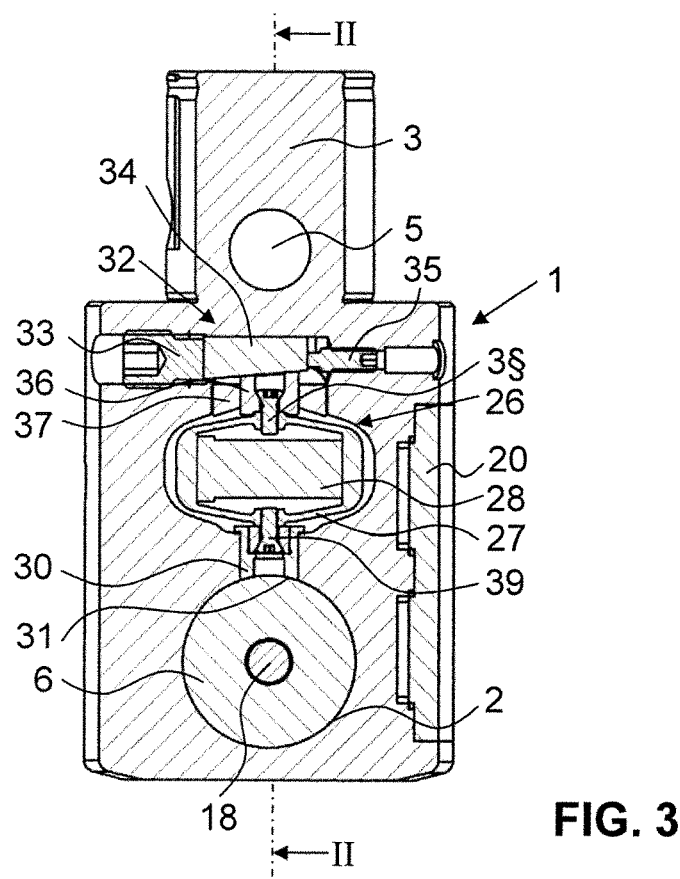
FIG. 3 shows a cross-sectional view of the boring head of FIG. 1 along the plane III-III as depicted in FIG. 2.
Figure 4:
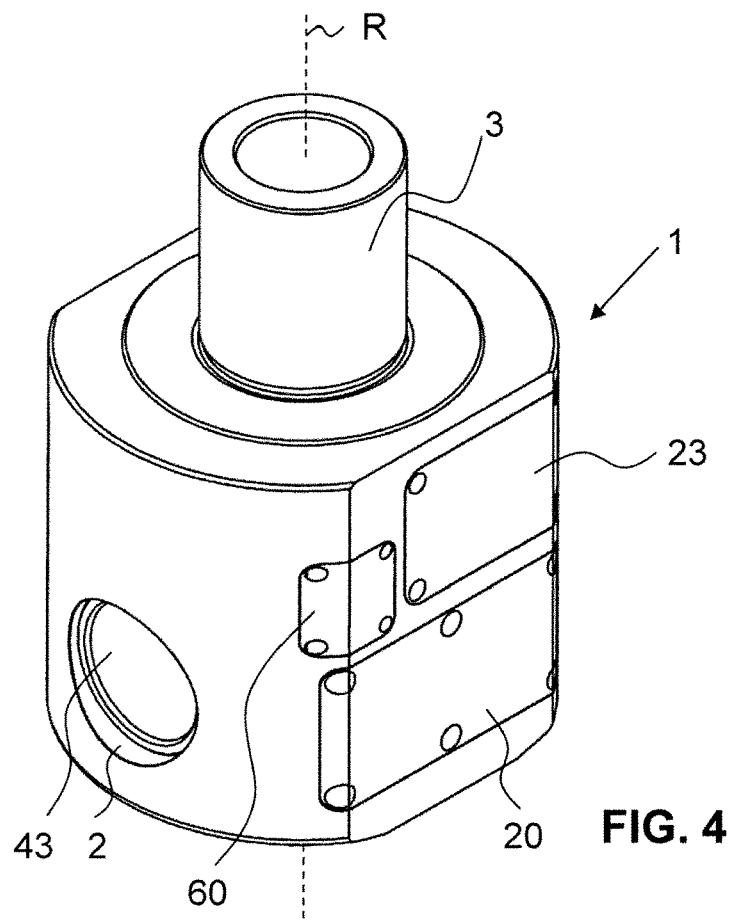
FIG. 4 shows a perspective view of a second embodiment of an inventive boring head with an active clamping mechanism.
Figure 5:
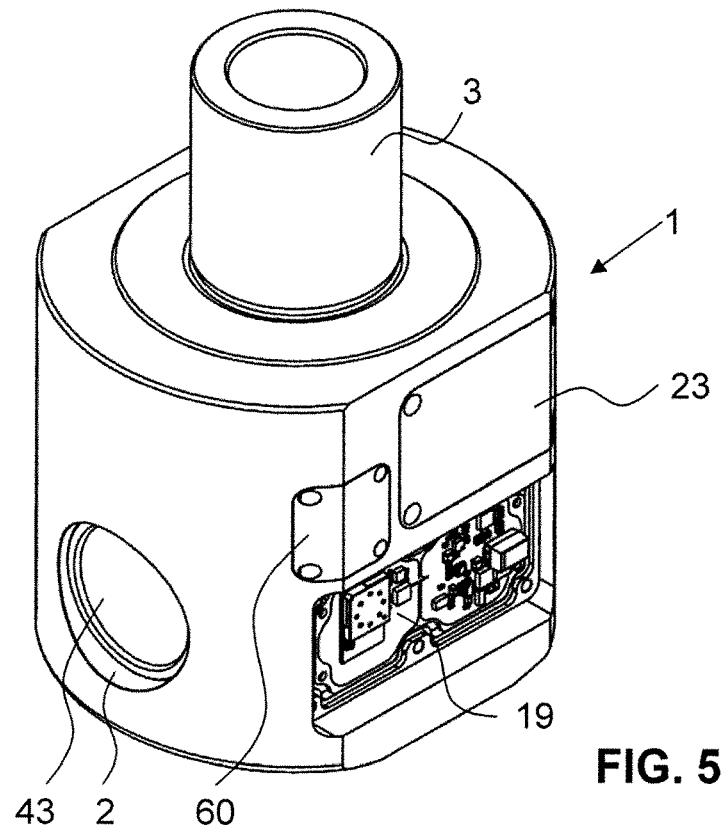
FIG. 5 shows the same view of the boring head of FIG. 4, but with removed cover of the electronic unit.
Figure 6:
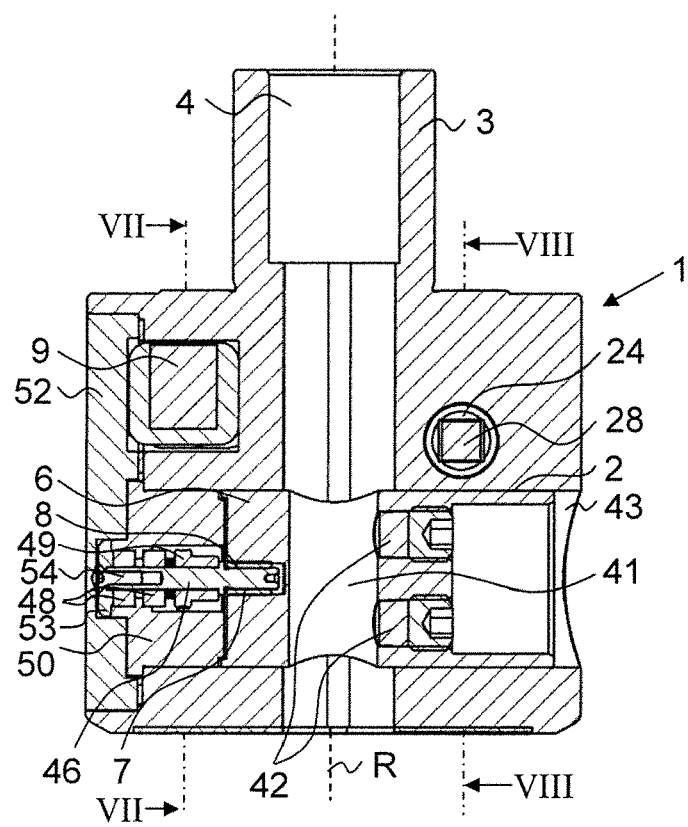
FIG. 6 shows a central cross-sectional view of the boring head of FIG. 4 along the plane VI-VI as depicted in FIG. 7.
Figure 9:
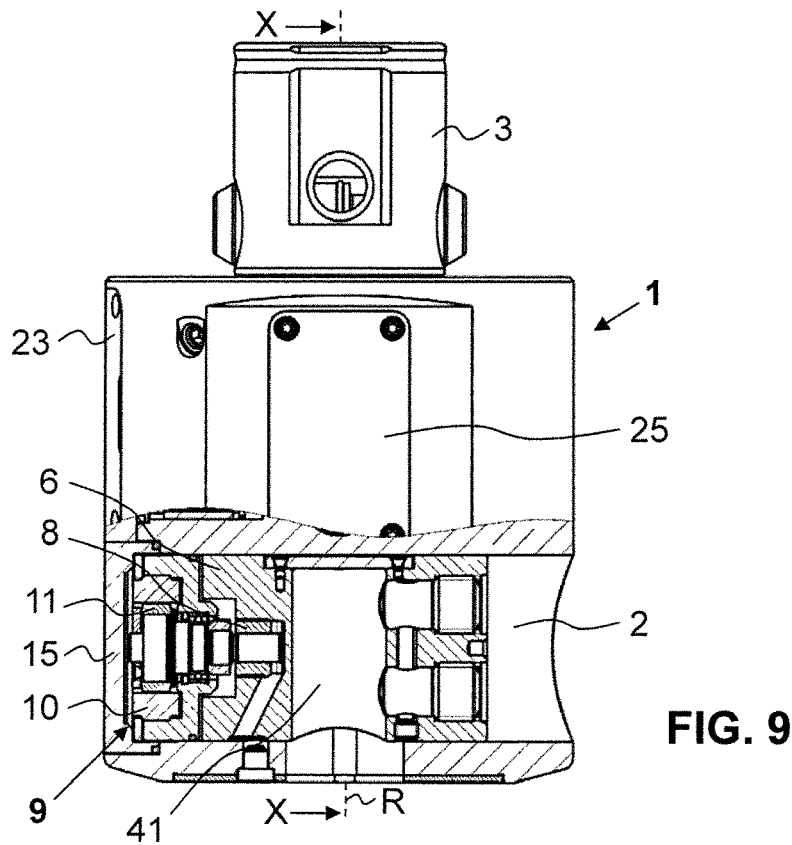
FIG. 9 shows a partially cross-sectional, partially lateral view of a third embodiment of an inventive boring head with an active clamping mechanism.
Figure 10:
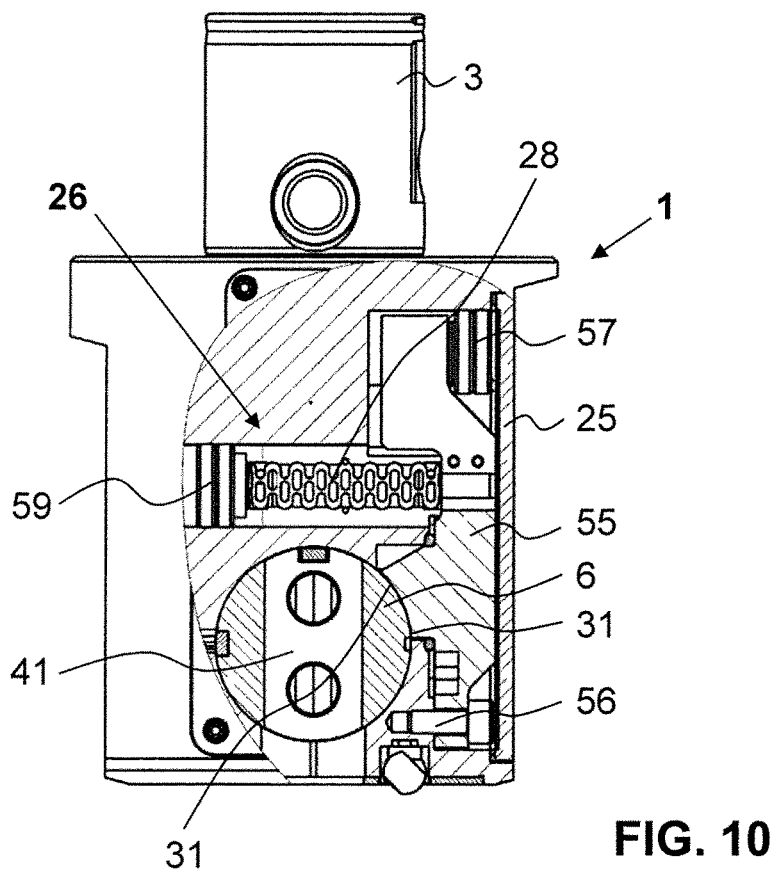
FIG. 10 shows a partially cross-sectional view of the boring head of FIG. 9 along the plane X-X as depicted in FIG. 9.

FIGS. 1 to 3 show a first embodiment and FIGS. 4 to 8 a second embodiment of an inventive boring head having an active clamping mechanism. While the first embodiment allows the machining of bores with particularly large diameters, high radial forces can be applied on the machined workpiece by means of the second embodiment. A third inventive embodiment of a boring head with an active clamping mechanism is shown in FIGS. 9 to 10, a fourth inventive embodiment in FIGS. 11 and 12 and a fifth inventive embodiment in FIGS. 13 to 16. In FIGS. 1 to 16, elements having an identical or similar function are designated by the same reference signs in each case.

As shown in FIG. 1, the first embodiment of a preferred boring head comprises a tool body 1 of essentially cylindrical form. Attached to the tool body 1 and made in one piece therewith is a fastening peg 3. The fastening peg 3 also has a cylindrical form, but with a smaller diameter than the tool body 1. The fastening peg 3 has a central longitudinal bore 4 and a transversal bore 5 which intersects the longitudinal bore 4. The boring head is adapted to be fastened to a boring machine by means of the fastening peg in a manner as known to the skilled person. During a boring operation, a rotating motion is transmitted from the boring machine to the boring head which, as a result, rotates about a main rotation axis R. The main rotation axis R also forms the central longitudinal axis of the cylindrical form of the tool body 1.

In the region towards the end face of the tool body 1 that is directed away from the fastening peg 1, the tool body 1 comprises a transversal opening 2 (see FIG. 2). The transversal opening 2 is a through-bore that extends perpendicularly to the main rotation axis R. Within the transversal opening 2, a tool carrier 6 is arranged in a displaceable, but not rotatable manner relative to the tool body 1. The tool carrier 6 generally has a cylindrical outer shape with a first and a second end face. The cylindrical outer shape of the tool carrier 6 is designed such as to be complementary to the transversal opening 2 of the tool body 1.

Attached to the first end face of the tool carrier 6 is a cutting tool 16. As can be seen in FIG. 2, the cutting tool 16 is in the form of an indexable cutting insert. For attaching the cutting tool 16 on the tool carrier 6, a tool attachment part 17 is used which itself is attached to the first end face of the tool carrier 6 by means of a fastening screw 18. For this purpose, the fastening screw 18 is screwed into an internal thread provided in a central bore 7 of the tool carrier 6. The central bore 7 extends centrally from the first to the second end face through the entire tool carrier 6.

For displacing the tool carrier 6 in a transversal direction relative to the tool body 1, a motor 9 is arranged within the tool body 1 in the region of the second end face of the tool carrier 6. The motor 9, which is fixed in position relative to the tool body 1, is an electric DC-motor with an outer stator 10 and an inner rotor 11. The rotor 11 has a drive shaft 12 which extends into the central bore 7 of the tool carrier 6. The drive shaft 12 has an outer thread which engages with an inner thread provided in a nut 8. The nut 8 is fixed in a torque proof manner within the central bore 7 of the tool carrier 6. In different embodiments, the nut 8 could also be made in one piece with the tool carrier 6. Thus, by rotating the drive shaft 12, the tool carrier 6 can be displaced in a transverse direction within the transversal opening 2 due to the mutual engagement of the threads of the drive shaft 12 and the nut 8.

By displacing the tool carrier 6 in a transversal direction, the boring head can be adjusted to different boring diameters and the wear of the cutting tool 16 can be compensated for during the boring operations.

For the supply of electric energy to the motor 9, one or more batteries 22 are arranged in a battery compartment 21. The battery compartment 21 is arranged between the fastening peg 3 and the transversal opening 2 and is accessible from a lateral opening provided in the tool body 1. The opening to the battery compartment 21 can be closed by means of a cover 23.

For detecting the rotational position of the rotor 11, a rotation sensor 13 is provided. For this purpose, the rotor 11 comprises a decoder magnet which is arranged directly adjacent to a decoder printed circuit board (PCB) which is stationary with respect to the tool body 1. Alternatively or additionally, a position sensor can be provided, in order to measure the displacement position of the tool carrier 6 relative to the tool body 1.

The motor 9 is accessible from a further lateral opening in the tool body 1. The opening can be closed by means of a cover 15. The rotation sensor 13 is arranged between the motor 9 and the cover 15.

For preventing a displacement of the tool carrier 6 during boring operations, a clamping mechanism 26 is provided within a clamping compartment 24 of the tool body 1. The clamping mechanism 26 which is shown in FIGS. 2 and 3 is arranged in the region between the tool carrier 6 and the fastening peg 3. The clamping compartment 24 is accessible via a lateral opening provided in the tool body 1. This lateral opening can be closed by means of a cover 25.

The clamping mechanism 26 comprises an active element in the form of a stack of piezo elements 28. The stack of piezo elements 28 expands longitudinally, if an electric voltage is applied thereto. The direction along which the stack of piezo elements 28 is able to expand lies within in a plane that extends in parallel to the direction of displacement of the tool carrier 6. In the present embodiment, the expansion direction of the stack of piezo elements 28 extends along a perpendicular, but not radial, direction relative to the direction of displacement of the tool carrier 6.

As shown in FIG. 3, the stack of piezo elements 28 is arranged within a clamping bracket 27, which completely surrounds the stack of piezo elements 28. The arrangement of the stack of piezo elements 28 within the clamping bracket 27 is such that if the stack of piezo elements 28 is expanded along of its longitudinal direction, the clamping bracket 27 is stretched along the same direction. The stretching of the clamping bracket 27 along the longitudinal direction of the stack of piezo elements 28 results in a contraction of the clamping bracket 27 along a perpendicular direction, i.e. a radial direction relative to the displacement direction of the tool carrier 6. This radial direction, along which the clamping bracket 27 is contracted, represents the clamping direction. Both the stack of piezo elements 28 and the clamping bracket 27 represent clamping elements of the clamping mechanism 26. Thus, in the non-activated state of the clamping mechanism 26, i.e. if no electric voltage is applied to the stack of piezo elements 28, the clamping bracket 27 exerts a clamping force on the outer surface of the tool carrier 6. Thus, the clamping bracket 27 is pre-stressed. Due to this clamping force, the tool carrier 6 is clamped between the clamping bracket 27 and an inner surface delimiting the transversal opening 2 of the tool body 1, as a result of which a displacement of the tool carrier 6 relative to the tool body 1 is prevented. The clamping mechanism 26 is brought in its activated state by means of applying an electric voltage to the stack of piezo elements 28. As a result of this application of the electric voltage, the clamping bracket 27 is contracted along the radial direction of the tool carrier 6 and the tool carrier 6 is released by the clamping mechanism 26, such that a displacement relative to the tool body 1 is enabled.

Between the clamping bracket 27 and the outer surface of the tool carrier 6, a clamping pad 30 is provided which is attached to the clamping bracket 27 by means of an attachment screw 39. The clamping pad 30 comprises a clamping surface 31 which directly contacts the cylindrical outer surface of the tool carrier 6.

As can be seen from FIG. 3, the clamping surface 31 has a rounded shape that is complementary to the outer surface of the tool carrier 6. In this way, the friction between the clamping pad 30 and the tool carrier 6 can be improved.

For adjusting the clamping force of the clamping mechanism 26, an adjusting mechanism 32 is provided. The adjusting mechanism 32 comprises an adjusting wedge 34. The clamping bracket 27 is arranged between this adjusting wedge 34 and the tool carrier 6. The adjusting wedge 34 is radially displaceable within the tool body 1, and depending on the position of the adjusting wedge 34, the clamping force as effected by the clamping bracket 27 is larger or smaller. The position of the adjusting wedge relative to the clamping bracket 27 can be adjusted by an adjusting screw 33 and an counter screw 35. Between the adjusting wedge 34 and the clamping bracket 27, an adjusting cylinder 36 is provided which is attached to the clamping bracket 27 by means of an attachment screw 38. The adjusting cylinder 36 is arranged within an adjusting bracket 37. A lateral screw 40 is laterally screwed through the adjusting bracket 37, in order to secure the adjusting cylinder 36 (FIG. 2). The lateral screw 40 is accessible from the outside, if the cover 25 is removed.

For controlling the motor 9 and the clamping mechanism 26, an electronic unit 19 is provided within the tool body 1 (see FIG. 1). The electronic unit 19 is in the form of a printed circuit board (PCB) and comprises e.g. at least a processor and a data storage module. The electronic unit 19 is accessible via a lateral opening of the tool body 1. This lateral opening can be closed by means of a cover 20 (FIG. 3). The electronic unit 19 can comprise a wireless unit, in order to transmit and/or receive data and/or control signals to and from an external device, such as a desktop or tablet computer or a smart phone or smart watch. The transmission can for example be carried out via the Bluetooth-standard.

A second embodiment of an inventive boring head is shown in FIGS. 4 to 8 which is described in the following.

In comparison to the embodiment of FIGS. 1 to 3, the one of FIGS. 4 to 8 is adapted for the machining of bores with a smaller diameter.

As can be seen from FIGS. 4 to 8, the boring head according to this embodiment also comprises a tool body 1 with a fastening peg 3 and a transversal opening 2 in which a radially displaceable, cylindrical tool carrier 6 is arranged. In contrast to the embodiment of FIGS. 1 to 3, the cutting tool is here not attached to an end face of the tool carrier 6, but via a tool holder to a tool attachment bore 41 which extends along the main rotation axis R through the tool carrier 6 (see FIG. 6). Please note that the tool holder and the cutting tool are not shown in FIGS. 4 to 8. For this purpose, the tool holder comprises a cylindrical, rod-shaped part which is introduced into the tool attachment bore 41 through a central opening provided on the side of the tool body 1 which is arranged opposite to the fastening peg 3. For the fixation of the tool holder to the tool carrier 6, fastening screws 42 are provided which are screwed into one end of the tool carrier 6. The respective end of the tool carrier 6 can be closed by means of a cover 43.

The boring head as shown in FIGS. 4 to 8 is particularly adapted to apply high radial cutting forces to the machined part. In order to cool the cutting tool and the machined part during the boring operation, a cooling liquid can be brought through the boring head to the cutting tool. For this purpose, the longitudinal bore 4 extends through both the fastening peg 3 and the tool body 1. A plurality of respective sealings are provided within the boring head, in order to prevent an escape of the cooling liquid during the boring operation.

In another embodiment, the tool body 1 can also have an additional through-channel that extends outside of the tool carrier 6 from the fastening peg 3 to the end face of the tool body 1, in order to guide cooling liquid to the cutting tool. The provision of a separate through-channel in the tool body 1 has the advantage that less sealings are needed between movable parts. Furthermore, guiding the cooling liquid through a (decentrally arranged) through-channel instead through the centrally arranged longitudinal bore 4 brings about the further advantage that the stack of piezo elements 28 can be arranged centrally, i.e. so as to intersect with the main rotation axis R, in order to minimize the centrifugal forces acting on the stack of piezo elements 28 during operation of the boring head.

In order to achieve a higher power for radially displacing the tool carrier 6 within the transversal opening 2, in the present embodiment, the motor 9 is arranged such that its rotation axis extends perpendicularly to the direction of displacement of the tool carrier 6. As a result, the motor 9 can have relatively large dimensions due to its arrangement in a region of the tool body 1 between the fastening peg 3 and the transversal opening 2. Moreover, a higher displacement force is achieved by the provision of a gear which in this case is a worm gear. The worm gear comprises a worm screw 44 and a worm wheel 49.

Figure 7:
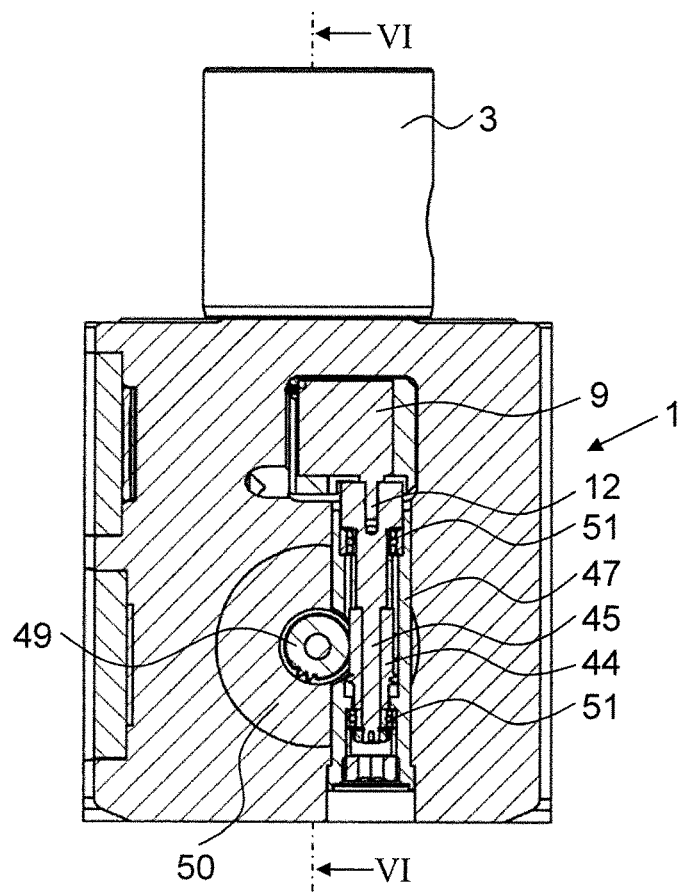
FIG. 7 shows a cross-sectional view of the boring head of FIG. 4 along the plane VII-VII as depicted in FIG. 6.

As shown in FIG. 7, a first drive spindle 45 is attached in a torque proof manner to the drive shaft 12 of the motor 9. The first drive spindle 45 extends in parallel to the main rotation axis R of the tool body 1. Attached to the first drive spindle 45 in a torque proof manner is the worm screw 44. Of course, the first drive spindle 45 and the worm screw 44 could also be made together in one piece. The first drive spindle 45 and the worm screw 44 are arranged within a bearing tube 47. Several bearings 51 are provided within the bearing tube 47, in order to hold the first drive spindle 45.

The worm screw 44 engages with the worm wheel 49 which is attached in a torque proof manner to a second drive spindle 46. Of course, it would also be possible to produce the second drive spindle 46 and the worm wheel 49 together in one piece. The second drive spindle 46 is held by several bearings 48 which are arranged in a gear housing 50 and by a spindle fastening disc 53. A spindle fastening screw 54 reaches through the spindle fastening disc 63 into an end of the second drive spindle 46. The gear housing 50 is inserted in the transversal opening 2 of the tool body 1.

Attached in a torque proof manner to the second drive spindle 46 is a nut 8. The nut 8 could also be made together with the second drive spindle 46 in one piece. The nut 8 comprises an outer thread which engages with an inner thread provided in a central bore of the tool carrier 6. Thus, a rotation effected by the motor 9 is transferred to the first drive spindle 45, via the worm gear 44, 49 to the second drive spindle 46 and from there to the nut 8. Due to the thread engagement of the nut 8 with the tool carrier 6, a rotation of the nut 8 results in a displacement of the tool carrier 6 within the transversal opening 2.

The compartment of the tool body 1 in which the motor 9 is arranged and the lateral region of the transversal opening 2 in which the gear housing 50 and the worm gear 44, 49 are arranged are accessible through a common lateral opening provided in the tool body 1. This opening can be closed by a cover 52. The cover 52 also serves to hold the spindle fastening disc 53.

Figure 8:
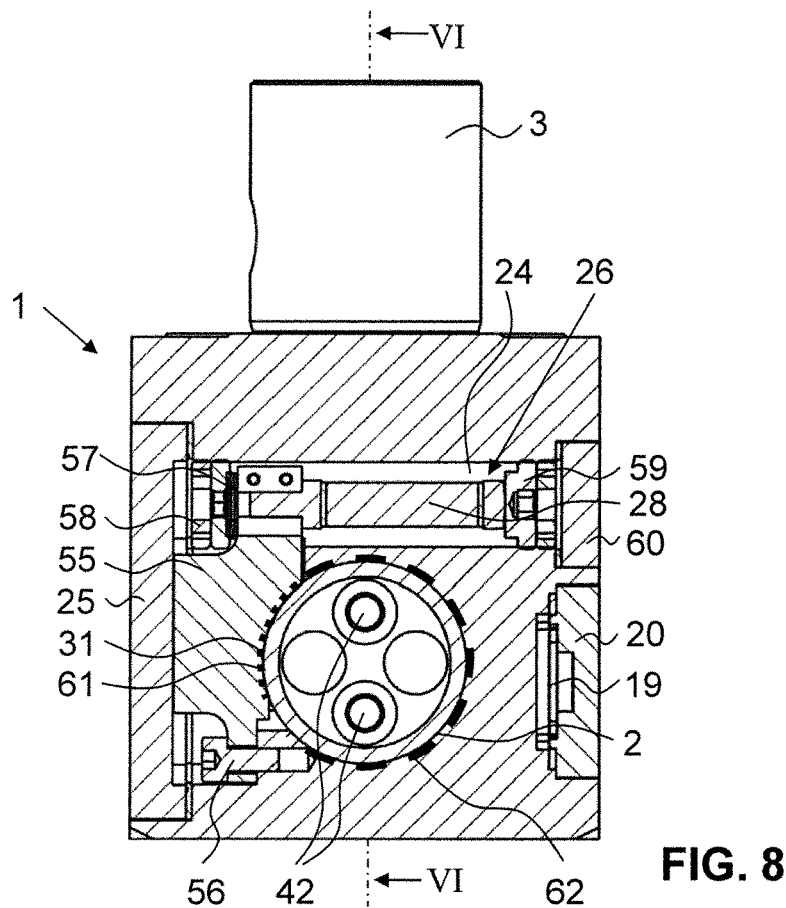
FIG. 8 shows a cross-sectional view of the boring head of FIG. 4 along the plane VIII-VIII as depicted in FIG. 6.

The clamping mechanism 26 as used in the embodiment of FIGS. 4 to 8 can be seen particularly well in FIG. 8. Similar as the clamping mechanism 26 of the embodiment of FIGS. 1 to 3, the present clamping mechanism also comprises a stack of piezo elements 28 which are expanded, if an electric voltage is applied. Instead of the clamping bracket 27, however, a clamping beam 55 is provided here, in order to exert a clamping force on the tool carrier 6. The clamping beam 55 has an end section with a comparatively low stiffness, which is achieved by a thinner design of the clamping beam 55 in the respective section. This end section of the clamping beam 55 is attached to the tool body 1 by means of an attachment screw 56. The clamping beam 55 as a whole forms a lever that is pivotable about its end section relatively to the tool carrier 6. The clamping beam 55 extends along the circumference of the tool carrier 6 or, in other words, along a direction which is perpendicular to both the displacement direction and the radial direction of the tool carrier 6.

The clamping beam 55 has a rounded clamping surface 31 which directly bears against the cylindrical outer surface of the tool carrier 6 in the unactivated state of the clamping mechanism 26. As a result, the tool carrier 6 is clamped between the clamping beam 55 and an inner surface of the transversal opening 2 of the tool body, in order to prevent a displacement of the tool carrier 6 relative to the tool body 1 during the boring operation.

Similar as in the previous embodiment, the radius of the clamping surface 31 is adapted to the outer surface of the tool carrier 6.

For activating the clamping mechanism 26, an electric voltage is applied by an electronic unit 19 to the stack of piezo elements 28. As a result, the stack of piezo elements 28 expands and pushes the clamping beam 55 away from the tool carrier 6. The stack of piezo elements 28 pushes the clamping beam 55 in an end region opposite to the end region where the clamping beam 55 is attached to the tool body 1 by means of the attachment screw 56.

The stack of piezo elements 28 is fixedly attached with one end to the clamping beam 55. Accessibility to the clamping mechanism 26 and particularly to the clamping beam 55 is given by means of a lateral opening provided in the tool body 1. The opening is closable by means of a cover 25. Between the cover 25 or an inner surface of the tool body 1 and the clamping beam 55, a spring 57 and a first adjusting nut 58 can be provided. The spring 57 is arranged such, that it supports the clamping of the clamping beam 55 against the tool carrier 6 in the unactivated state of the clamping mechanism 26. A second adjusting nut 59 can be provided between the opposite end of the stack of piezo elements 28 and an inner surface of the tool body 1 or a further cover 60. By means of the adjusting nuts 58 and 59, the clamping force of the clamping mechanism 26 exerted on the tool carrier 6 can be adjusted.

In order to improve the retention force of the clamping beam 55 with respect to the tool carrier 6, the clamping surface 31 and/or the respective part of the outer surface of the tool carrier 6 preferably comprises a high-friction coating 61. The high-friction coating 61 is preferably applied to the clamping beam 55 and/or the tool carrier 6 by means of thermal spraying, in particular by means of atmospheric plasma spraying. A particularly preferred material for the high-friction coating 61 is aluminium oxide ($Al_2O_3$), titanium oxide ($TiO_2$) or a combination of these materials. A high-friction coating is preferably also provided on the clamping surface 31 of the clamping pad 30 and/or on the respective part of the outer surface of the tool carrier 6 of the boring head according to the embodiment as shown in FIGS. 1 to 3.

In order to improve the displaceability of the tool carrier 6 relative to the tool body 1, the respective contact surfaces of the tool carrier 6 and/or of the tool body 1 preferably comprise a low-friction coating 62. A particularly preferred material for the low-friction coating 62 is a material containing tungsten, in particular a material having a matrix of carbon and hydrogen with inclusions containing tungsten, such as Balinit® C of Oerlikon Balzers Coating S.A., Brügg, Switzerland. The low-friction coating 62 is preferably applied to the tool carrier 6 and/or to the tool body 1 by means of a sputtering deposition process, in particular by reactive (cathodic) sputtering, i.e. physical vapour deposition (PVD)-sputtering. If the coating material contains tungsten, the reactive gas preferably contains carbon. A low-friction coating is preferably also provided on the outer surface of the tool carrier 6 and/or on the respective contact surfaces of the tool body 1 of the boring head according to the embodiment as shown in FIGS. 1 to 3.

Alternatively, the coating 62 can also be a high-friction coating. The application of a high-friction coating 62 on the tool carrier 6 and/or on the tool body 1 can be advantageous, in order to avoid undesired displacements of the tool carrier 6 relative to the tool body 1 during the operation of the boring head. Such undesired displacements can for example be caused by a certain play of the elements of the clamping mechanism 26 within the tool body 1. A particularly preferred material for the high-friction coating 62 is aluminium oxide ($Al_2O_3$), titanium oxide ($TiO_2$) or a combination of these materials.

A third embodiment of an inventive boring head is shown in FIGS. 9 and 10. While the principle for displacing the tool carrier 6 relative to the tool body 1 is similar as the one of the embodiment shown in FIGS. 1-3, the principle of the clamping mechanism 26 is similar as the one of the embodiment shown in FIGS. 4-8.

As can be seen in FIG. 9, the tool carrier 6 comprises a tool attachment bore 41 which extends along the main rotation axis R and serves for the attachment a rod-shaped tool holder with a cutting tool. For transversally displacing the tool carrier 6, a motor 9 with a stator 10 and a rotor 11 is arranged within the transversal opening 2 of the tool body 1 near an end face of the tool carrier 6. A nut 8 with an inner thread is fixed in a torque proof manner within a central bore of the tool carrier 6. As in the embodiment of FIGS. 1-3, the rotational motion of the motor 9 is transferred into a radial displacement of the tool carrier 6 via a threaded drive shaft that engages with the inner thread of the nut 8.

The clamping mechanism 26 of the current embodiment is shown in FIG. 10. Similar as in the embodiment of FIG. 8, a clamping beam 55 serves as the clamping element that directly contacts the tool carrier 6 in the clamped state. The clamping beam 55 is attached with a first end to the tool body 1 by means of an attachment screw 56 in a region near the end face of the tool body 1. The second end of the clamping beam 55 is biased such by a spring 57, that the rounded clamping surface 31 of the clamping beam 55 is pressed against the tool carrier 6. For releasing the clamping force, a stack of piezo elements 28, which extends in a perpendicular direction relative to the displacement direction of the tool carrier, can be activated, in order to press the clamping beam 55 away from the tool carrier 6.

In the present embodiment, the stack of piezo elements 28 is arranged between two flat springs, which laterally extend along the entire longitudinal extension of the stack of piezo elements 28. The flat springs could of course also be replaced by e.g. a single helical spring. The flat springs serve to exert a pre-load force on the stack of piezo elements 28. In this way, undesired movements of the stack of piezo elements 28 can be avoided in particular in the unactivated state of the piezo elements.

Figure 11:
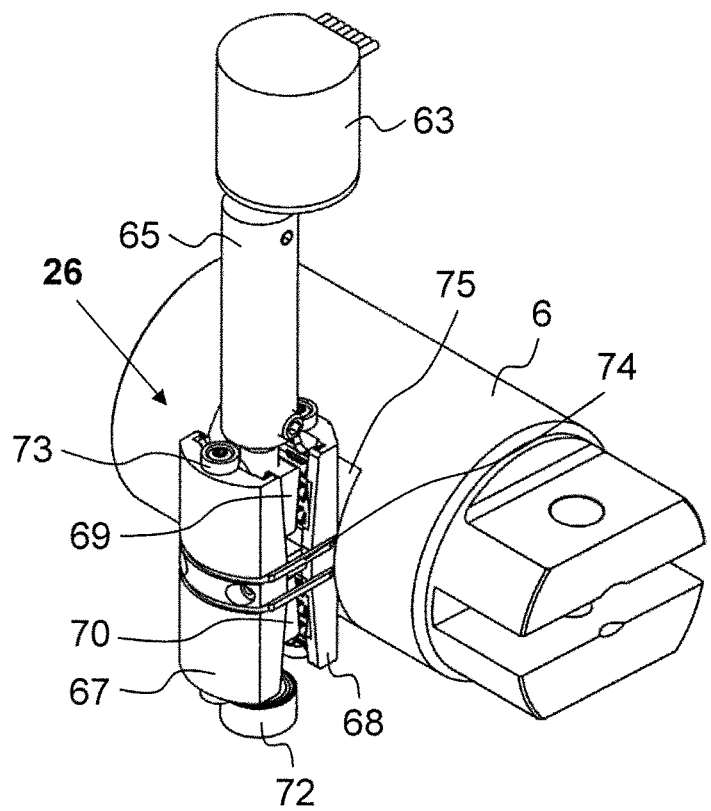
FIG. 11 shows a perspective view of a tool carrier and an active clamping mechanism of a fourth embodiment of an inventive boring head.
Figure 12:
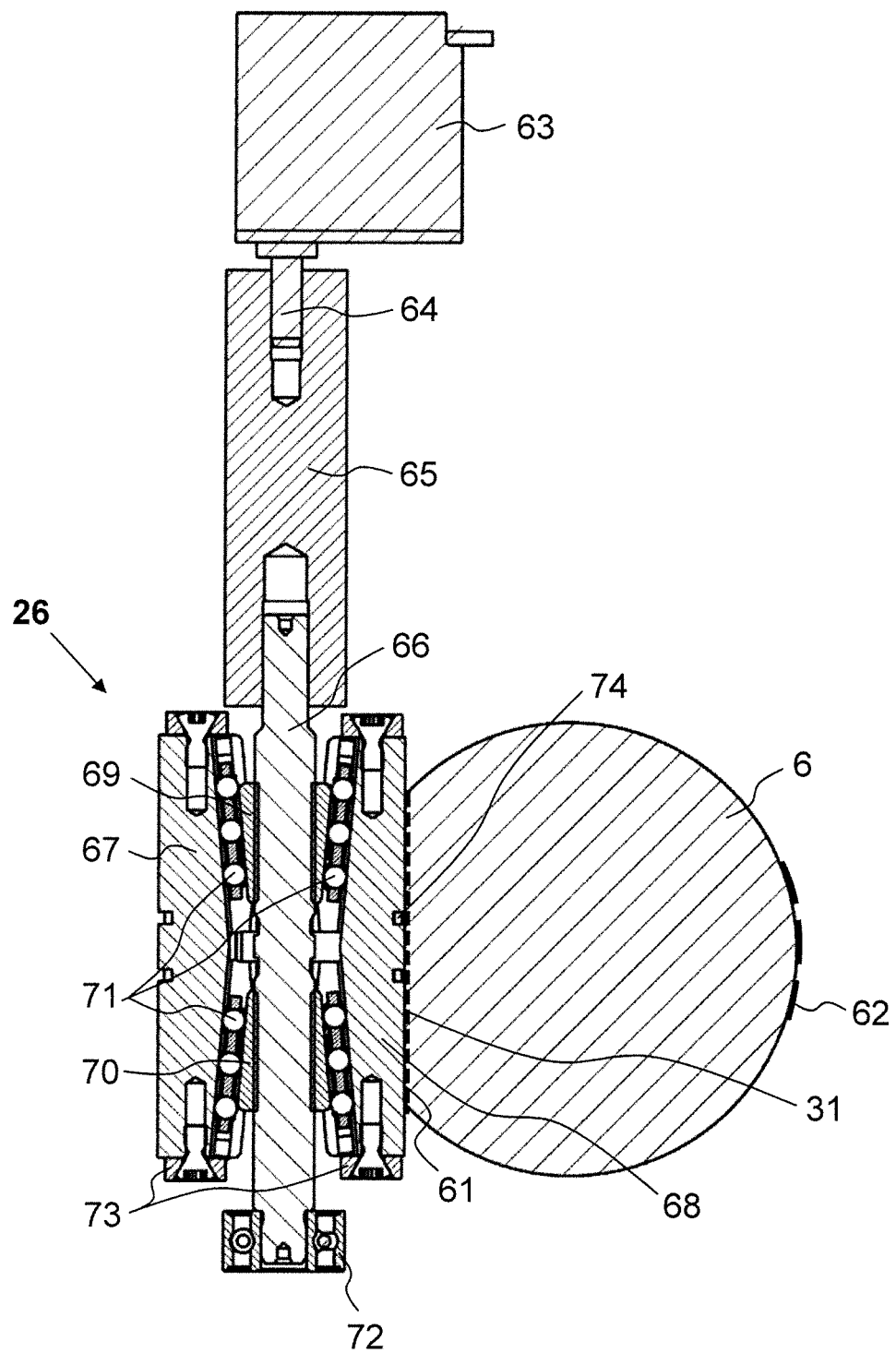
FIG. 12 shows a central cross-sectional view of the clamping mechanism as shown in FIG. 11.
Figure 13:
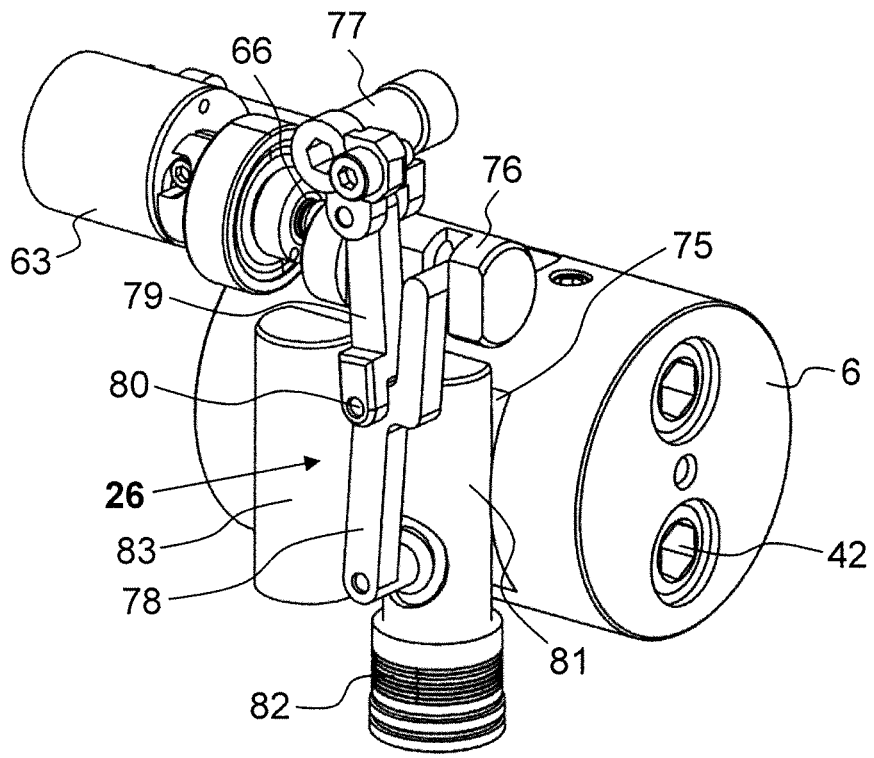
FIG. 13 shows a perspective view of a tool carrier and an active clamping mechanism of a fifth embodiment of an inventive boring head.
Figure 14:
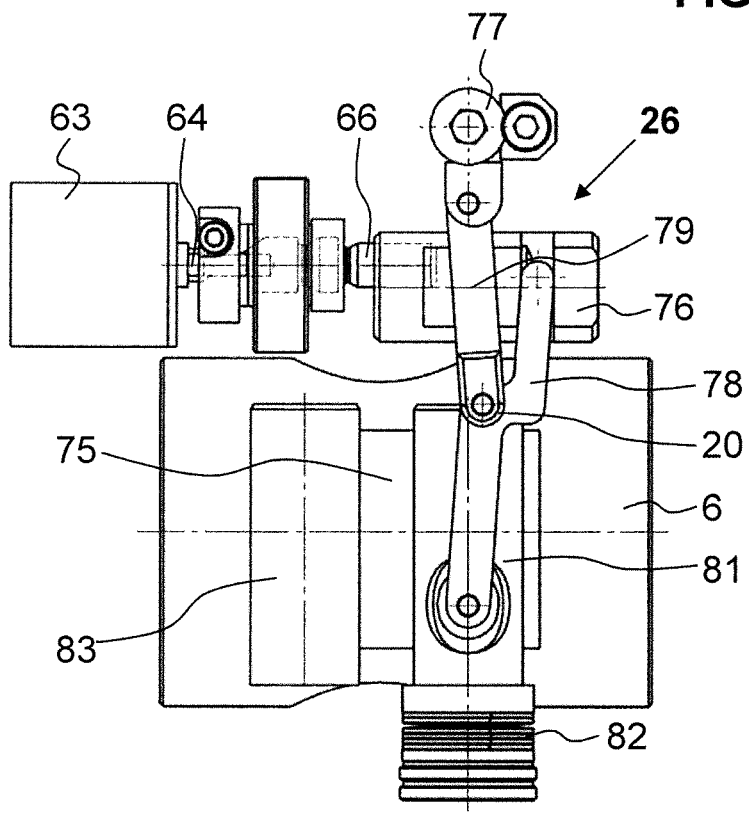
FIG. 14 shows a first side view of the clamping mechanism and of the tool carrier as shown in FIG. 13.

FIGS. 11-12 show a clamping mechanism 26 according to a fourth embodiment of an inventive boring head.

The motor for radially displacing the tool carrier 6 relative to the tool body 1 is not shown in FIGS. 11 and 12. The principle for displacing the tool carrier 6 can be in accordance to any of the principles as indicated with respect to the embodiments of FIGS. 1-10. The same holds with respect to the embodiment shown in FIGS. 13-16.

For clamping the tool holder 6, in order to prevent undesired displacements during the operation of the boring head, the clamping mechanism 26 comprises clamping jaws 67 and 68 (see FIG. 11). The clamping jaws 67, 68 are arranged in parallel to each other, such that a gap is formed in-between. The first clamping jaw 67 bears against an inner surface of the tool body 1 (not shown in FIGS. 11 and 12) and the second clamping jaw 68 bears against an outer surface in a recess 75 of the tool carrier 6.

As can be seen in FIG. 12, the clamping jaws 67, 68 have inclined surfaces facing towards the gap. The inclined surfaces are formed in such a way that the gap between the clamping jaws 67, 68 is widened up from the middle to both opposite directions along an axis that extends in parallel to the main rotation axis R. Thus, in the cross-sectional view as shown in FIG. 12, the gap, which is formed between the clamping jaws 67, 68, has the shape of two wedges facing each other, with a narrow middle section that widens up to both opposite directions.

A threaded shaft 66 that is attached, via a connector 65, to the drive shaft 64 of a DC-motor 63 in a torque proof manner extends in a direction parallel to the main rotation axis R and through the gap formed between the inclined surfaces of the clamping jaws 67, 68. Between the clamping jaws 67 and 68, two wedges 69, 70 are arranged, through which the threaded shaft 66 extends. The wedges 69, 70 are arranged above and below the narrow middle section of the gap between the clamping jaws 67, 68 in such a way that their outer shapes widen up in the same direction as the gap. Each of the wedges 69, 70 comprises a threaded through-hole. The inner threads of the wedges 69, 70 are oriented in opposite directions. Corresponding outer threads that mate with the threads of the wedges 69, 70 are provided on the threaded shaft 66.

Thus, since the first wedge 69 is e.g. left-threaded and the second wedge 70 is right-threaded, rotation of the threaded shaft 66 in a first direction results in the wedges 69, 70 to move towards each other and rotation of the threaded shaft 66 in the other second direction results in the wedges 69, 70 to move away from each other, i.e. away from the narrow middle section of the gap formed by the clamping jaws 67, 68. In the first case, i.e. when the wedges 69, 70 move away from each other, the clamping jaws 67, 68 can move towards each other and the clamping pressure on the tool carrier 6 is released. In the second case, when the wedges 69, 70 are moved towards each other, the clamping jaws 67, 68 are pressed away from each other, such that the first clamping jaw 67 is pressed against an inner surface of the tool body 1 and the second clamping jaw against the tool carrier 6. Thus, by activating the DC-motor 63, in order to rotate the threaded shaft 66, the clamping force on the tool carrier 6 can either be increased or decreased. In order to rotate the threaded shaft 66, an energy flow is required from a power source, such as a battery (not shown in FIGS. 11 and 12), to the DC-motor 63. The free end of the threaded shaft 66 is held in a ball bearing 72.

In order to minimize the friction between the wedges 69, 70 and the clamping jaws 67, 68 during rotation of the threaded shaft 66, needle bearings 71 are preferably provided between each inclined surface of the clamping jaws 67, 68 and the respective wedge 69, 70. The needle bearings 71 are held in the gap between the clamping jaws 67, 68 by means of stopper elements 73.

For better guidance of the clamping jaws 67, 68 and for avoiding the clamping jaws 67, 68 to be stuck in the clamped state, pull-back strips 74 can be provided which have a certain elasticity and surround the two clamping jaws 67, 68 in the region of the narrow middle section of the gap. Furthermore, guiding pins can be provided to ensure a proper alignment of the clamping jaws 67, 68. In the present embodiment, a guiding pin is arranged on each side of the threaded shaft 66 between the two pull-back strips 74. The guiding pins are attached to the second clamping jaw 68 and extend through openings that are provided on the first clamping jaw 67.

Similar as in the embodiment shown in FIGS. 4-8, a high-friction coating 61 can be applied to the second clamping jaw 68 in a region where its outer surface contacts the tool carrier 6. The clamping effect can be improved in this way. In a region where the outer surface of the tool carrier 6 contacts the tool body 1, in particular in a region opposite to the second clamping jaw 68, a high- or low-friction coating 62 can be provided on the tool carrier 6 and/or on the tool body 1.

The provision of the inclined surfaces of the wedges 69, 70 and the clamping jaws 67, 68 as well as the thread engagement between the threaded shaft 66 and the wedges 69, 70 allow a relatively high clamping force to be exerted on the tool carrier 6 by means of a relatively small DC-motor 63. The clamping force is maintained as long as the DC-motor 63 remains inactive.

In the fifth embodiment of an inventive boring head as shown in FIGS. 13 to 16, a further variant of an active clamping mechanism 26 with actively adjustable clamping force is shown.

Figure 15:
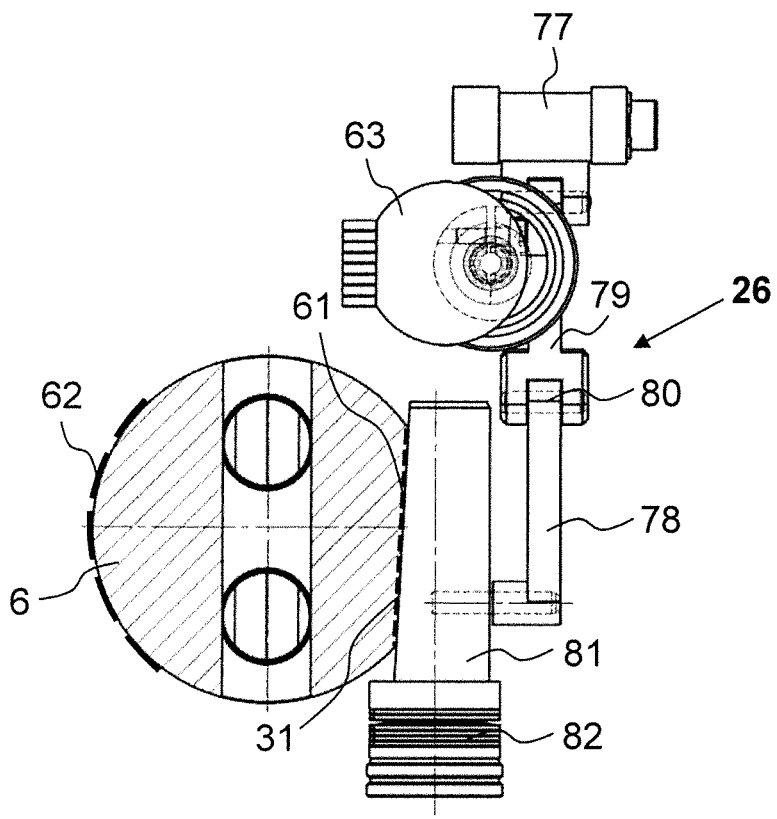
FIG. 15 shows a second side view of the clamping mechanism and of the tool carrier as shown in FIG. 13.
Figure 16:
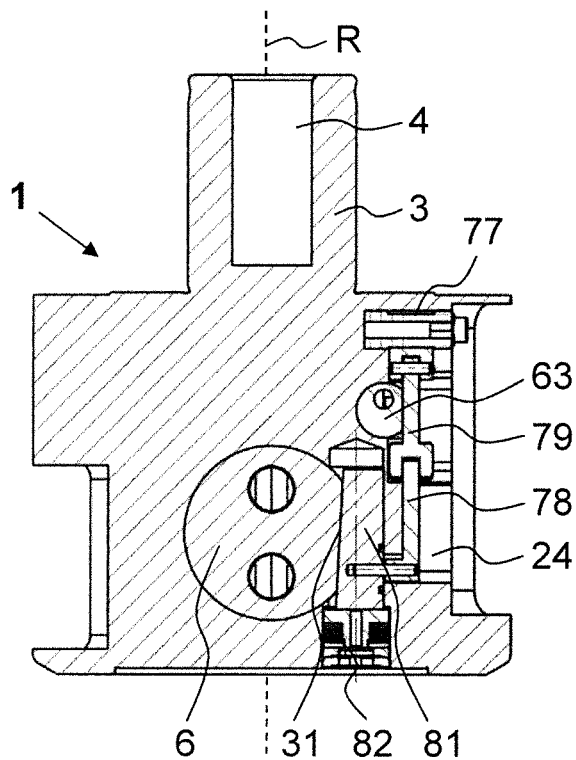
FIG. 16 shows a cross-sectional view of the boring head with the integrated clamping mechanism and tool carrier of FIG. 13.

The clamping mechanism 26 comprises a clamping piece 81 which forms the clamping element that comes in direct contact with the tool carrier 6 during the clamped state. The clamping piece 81 comprises a flat clamping surface 31 which extends in parallel to the displacement direction of the tool carrier 6 and is arranged in an area of a recess 75 formed in the cylindrical circumference of the tool carrier 6. As can be seen in FIGS. 15 and 16, the flat surfaces of the recess 75 and of the clamping piece 81 are both inclined with respect to the main rotation axis R of the tool body 1. Due to its inclined surface, the clamping piece 81 as a whole forms a wedge. A helical spring 82 is attached such to an end face of the clamping piece 81 that the clamping piece 81 is pressed along the main rotation axis R in the direction towards the fastening peg 3. Due to the inclination of the clamping surface 31 with respect to the main rotation axis R, the clamping piece 81 is pressed against the tool carrier 6 by the spring 82. In this way, the tool carrier 6 is clamped between the clamping piece 81 and, on the opposite side of the tool carrier 6 with respect to the clamping piece 81, to an inner surface of the tool body 1. In other words, the inclination of the flat contact surfaces of the recess 75 and of the clamping piece 81 results in a redirection of the force of the spring 82, in order to clamp the tool carrier 6 between the clamping piece 81 and the inner surface of the tool body 1 arranged on the opposite side of the tool carrier 6.

In order to prevent an undesired rotation of the tool carrier 6 about its longitudinal axis in view of the inclined clamping surface 31 during the clamping process, an anti-rotation bolt 83 is provided. The anti-rotation bolt 83 lies with a flat surface against a flat outer surface of the tool carrier 6 provided within the recess 75 (see FIGS. 13 and 14).

As in all embodiments described before and after, a high-friction coating 61 can be applied to the contact surfaces of the clamping piece 81 and/or of the tool carrier 6, in order to further avoid undesired displacements of the tool carrier 6 relative to the tool body 1. One or both of the contact surfaces of the tool carrier 6 and of the tool body 1 on the opposite side of the clamping piece 81 can comprise a high- or low-friction coating 62, in order to also avoid undesired displacements of the tool carrier 6 relative to the tool body 1 in view of e.g. an unavoidable certain play of the elements of the clamping mechanism 26 or to facilitate displacement of the tool carrier 6 e.g. when adjusting the boring diameter.

For releasing the clamping force, a DC-motor 63 is provided having a drive shaft 64 that is attached in a torque-proof manner to a threaded shaft 66. The threaded shaft 66 engages with the inner thread of a connection piece 76 in such a way, that a rotation of the DC-motor 63 results in a displacement of the connection piece 76 in parallel to the displacement direction of the tool carrier 6. A first lever 78 is hinged with a first end to the connection piece 76 and with a second end to the clamping piece 81. Approximately in the middle of the first lever 78, a hinge 80 is provided in which a first end of a second lever 79 is pivotably attached to the first lever 78. A second end of the second lever 79 is pivotably attached to an attachment part 77 which is fixedly attached to the tool body 1. If the clamping piece 81 is in its released state, the first and second lever 78, 79 both extend in a perpendicular direction with respect to the displacement direction of the tool carrier 6 and approximately in parallel to the main rotation axis R of the tool body 1.

In use, if the connection piece 76 is moved away from the DC-motor 63 (to the right in FIG. 14), the clamping piece 81 is drawn along the main rotation axis R towards the fastening peg 3 by the levers 78, 79 and, thus, with its inclined contact surface against the tool carrier 6. Thus, the clamping force is increased. If the connection piece 76 is moved to the DC-motor 63 by the latter (to the left in FIG. 14), the clamping piece 81 is pressed down towards the spring 82 by the levers 78, 79 and the clamping of the tool carrier 6 is released. Thus, the two levers 78, 79 together act as a "knee joint" in such a way that displacements of the connection piece 76 are transferred in displacements of the clamping piece 81 along the main rotation axis R.

As follows from the explanations above, with the clamping mechanism 26 of the embodiment of FIGS. 13 to 16, the clamping force acting on the tool carrier 6 can actively be adjusted by means of the DC-motor 63. If the DC-motor 63 is idle, the clamping force remains unchanged.

The provision of the levers 78, 79 as well as the thread engagement between the threaded shaft 66 and the connection piece 76 allow a relatively high counter force (against the force of the spring 82) to be exerted on the clamping piece 81 by means of a relatively small DC-motor 63.

The invention is of course not limited to the preceding presented embodiments and a plurality of modifications is possible. For example, the stack of piezo elements 28 could easily be replaced in all respective embodiments by e.g. a DC drive. The displaceability of the tool carrier 6 relative to the tool body 1 does not necessarily be transversally, but could also be in parallel to the main rotation axis R. Furthermore, for displacing the tool carrier 6, the motor 6 does not necessarily be an electric motor, but could also be in the form of a piezo motor or of a hydraulic motor for example. Instead of batteries 22, the electric main grid could for example be used for supplying the required electric energy to the clamping mechanism via e.g. sliding contacts or inductive energy transfer. A plurality of further modifications is possible.

The invention claimed is:

1. A boring head comprising
a tool body having a main rotation axis about which the tool body rotates during boring operations;
a tool carrier arranged in or on the tool body;
a first motor for displacing the tool carrier relative to the tool body along a displacement direction, the first motor being an electric motor with a stator and a rotor, wherein a main drive axis is defined by the rotation of the rotor during operation of the first motor, which main drive axis extends in parallel to the displacement direction; and
a clamping mechanism with a clamping element for effecting a clamping force on the tool carrier, in order to prevent a displacement of the tool carrier relative to the tool body during boring operations,
wherein the clamping mechanism is an active clamping mechanism which effects a clamping force that can be adjusted actively in such a way that an energy flow takes place from an energy source to the clamping mechanism, when the clamping mechanism is activated and/or is in its activated state,
wherein the clamping mechanism is based on the piezo-electric effect and comprises at least one piezo element, and
wherein the clamping element is adapted to be moved away from the tool carrier by means of an expansion of the piezo element as a result of an electric voltage acting on the piezo element.

2. The boring head as claimed in claim 1, wherein an energy storage device is provided, in order to supply the required energy for activating the clamping mechanism.

3. The boring head as claimed in claim 2, wherein the energy storage device is an electric energy storage device.

4. The boring head as claimed in claim 1, wherein the clamping mechanism has an idle state in which the tool carrier is clamped and an activated state in which a displacement of the tool carrier relative to the tool body is enabled.

5. The boring head as claimed in claim 1, wherein the clamping mechanism has an idle state in which the clamping force acting on the tool carrier remains unchanged and an activated state in which the clamping force acting on the tool carrier is increased or decreased.

6. The boring head as claimed in claim 1, wherein the boring head comprises a second motor for actively adjusting the clamping force.

7. The boring head as claimed in claim 6, wherein the second motor is a DC-motor.

8. The boring head as claimed in claim 1, wherein the clamping element has the form of a clamping bracket which at least partly surrounds a further clamping element of the clamping mechanism in such a way, that an expansion of the further clamping element along a first direction is converted into a contraction of the clamping bracket along a perpendicular second direction.

9. The boring head as claimed in claim 8, wherein the clamping bracket completely surrounds the further clamping element.

10. The boring head as claimed in claim 1, wherein the clamping element has the form of a clamping beam which is adapted to be moved away from the tool carrier by means of an expansion of a further clamping element of the clamping mechanism.

11. The boring head as claimed in claim 1, wherein the clamping mechanism comprises one or more wedges for effecting a clamping force on the tool carrier.

12. The boring head as claimed in claim 11, wherein the clamping mechanism comprises two wedges which can be moved towards each other or away from each other, in order to increase or decrease the clamping force.

13. The boring head as claimed in claim 1, wherein the clamping element comprises a clamping surface that extends in parallel to the displacement direction of the tool carrier, wherein the clamping mechanism further comprises a spring element that applies a spring force on the clamping element in a perpendicular direction of the displacement direction, and wherein the clamping surface is inclined with respect to direction of the spring force effected by the spring element.

14. The boring head as claimed in claim 13, wherein the clamping mechanism comprises at least two levers which are hinged to each other and serve to displace the clamping element in a direction opposite to the direction of the force that is applied by the spring element on the clamping element.

15. The boring head as claimed in claim 1, wherein the clamping mechanism comprises a clamping surface acting directly on an outer surface of the tool carrier, and wherein the clamping surface is adapted to the outer surface of the tool carrier.

16. The boring head as claimed in claim 1, wherein the rotor of the first motor comprises a drive shaft having an outer thread, wherein the tool carrier comprises a bore with an inner thread or a nut attached to the tool carrier in a torque proof manner comprises an inner thread, and wherein the outer thread of the drive shaft engages with this inner thread, such that a rotational motion of the rotor effected by the first motor is transferred into a displacement of the tool carrier relative to the tool body.

17. The boring head as claimed in claim 1, wherein the clamping mechanism comprises a clamping surface acting directly on an outer surface of the tool carrier, and wherein the clamping surface of the clamping mechanism and/or the outer surface of the tool carrier comprises a high-friction coating, in order to improve the retention force of the clamping mechanism.

18. The boring head as claimed in claim 1, wherein the tool carrier and/or the tool body comprises a low-friction coating, in order to facilitate the displacement of the tool carrier relative to the tool body.

19. The boring head as claimed in claim 1, wherein the tool carrier and/or the tool body comprises a high-friction coating in a region where the tool carrier contacts the tool body, in order to avoid displacements of the tool carrier relative to the tool body.

20. The boring head as claimed in claim 1, wherein the tool carrier is displaceable along a transverse direction relative to the main rotation axis of the tool body.

21. The boring head as claimed in claim 1, wherein the boring head comprises a rotation sensor for measuring the rotational position of a drive shaft or of a drive spindle which is used to transfer a rotational motion effected by the first motor into a displacement of the tool carrier relative to the tool body, and/or wherein the boring head comprises a position sensor for measuring the position of the tool carrier relative to the tool body.

* * * * *